Dec. 15, 1931.　　P. S. NISSON ET AL　　1,836,183
PRODUCTION OF MERCAPTANS AND MERCAPTIDES
Filed Jan. 11, 1927
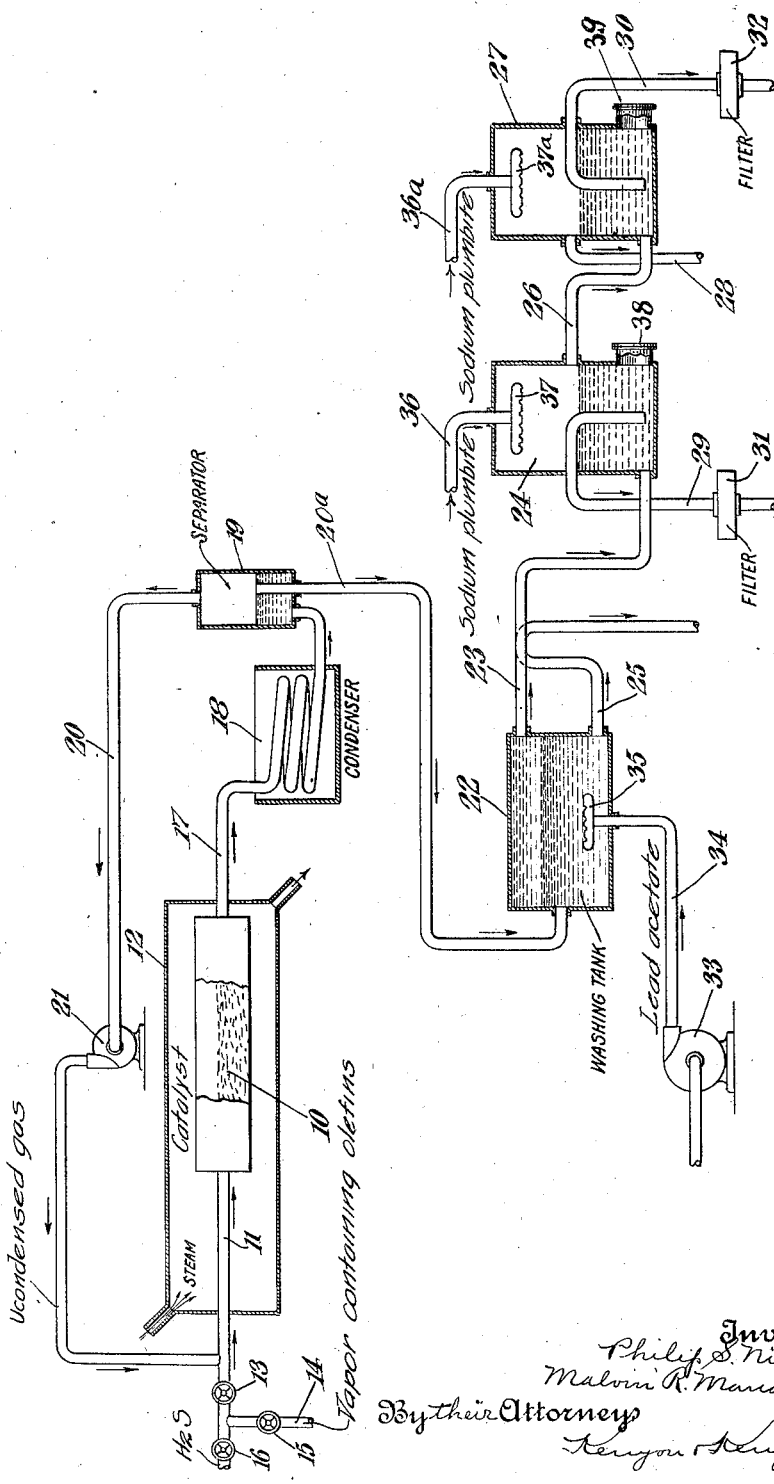

Patented Dec. 15, 1931.

1,836,183

UNITED STATES PATENT OFFICE

PHILIP S. NISSON AND MALVIN R. MANDELBAUM, OF BROOKLYN, NEW YORK, ASSIGNORS TO THE GRAY PROCESSES CORPORATION, OF NEWARK, NEW JERSEY, A CORPORATION OF DELAWARE

PRODUCTION OF MERCAPTANS AND MERCAPTIDES

Application filed January 11, 1927. Serial No. 160,361.

This invention relates to the production of mercaptans and mercaptides and has for an object a method of producing such compounds simply and inexpensively.

The unsaturated character of hydrocarbons in which the amount of hydrogen present is insufficient to satisfy the valence of all the carbon atoms is well known and is illustrated by their property of adding various types of compounds to their double bonds. This addition takes place with more or less ease, depending on the nature of the substances added and to a lesser extent upon the molecular structure of the unsaturated hydrocarbon.

In the case of hydrogen sulfide, the direct addition of the substance to an olefine has not been observed, although the reaction is of a type analogous to others which have been carried out successfully. We have discovered that if the olefine be vaporized and the vapors passed together with hydrogen sulfide gas over an adsorptive catalyst such as fuller's earth, silica gel or the like, a considerable yield of the mercaptans corresponding to the olefine used is obtained, as may be indicated by the reaction

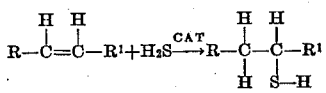

The olefines used may be synthetically prepared according to any of the known methods, but an especially convenient source is the vapor obtained from cracking hydrocarbons or by distilling cracked hydrocarbons. The vaporized olefines which may be diluted with saturated hydrocarbons are mixed with hydrogen sulfide gas and the mixture passed into contact with a bed of fuller's earth or the like. Where the olefine is produced by bracking oil containing sulfur, hydrogen sulfide is also a product and this hydrogen sulfide may be utilized for the purpose, with or without the addition of this gas from an external source. Either the vapors or the container for the catalyst or both should be heated if necessary to a temperature above the condensing point of the olefines present and preferably above that of the mercaptans formed, so that the latter are swept from the catalyst with the remaining vapors and may later be condensed. The reaction above described will take place to some extent at any temperature at which the unsaturated hydrocarbons used are gaseous. The process, therefore, may be carried on at atmospheric temperature, but better results are obtained when the process is carried on at temperatures above atmospheric.

The condensate will contain some of the hydrocarbons originally present as well as the mercaptans formed and some hydrogen sulfide in solution. The latter may be removed by washing with a solution of lead acetate made slightly acid with acetic acid or may be removed by other suitable reagent. The hydrogen sulfide free liquid is then preferably agitated with a solution of sodium plumbite, whereupon the lead mercaptide is formed. In the case of the lighter mercaptans, the mercaptide precipitates from solution as a yellow powder which may be separated by filtration. In the case of the heavier mercaptans, the mercaptides formed are wholly or in part dissolved in the residual oil and can be obtained therefrom by careful evaporation in vacuo or can be used in solution. Where the higher mercaptans alone are formed, the removal of hydrogen sulfide as a separate step may be eliminated, if desired, as the mercaptides formed will remain in solution in the oil, while the sulfide may be removed by filtration. When low boiling materials are being handled, it is best to subject the vapors to the washing solution before or during condensation. The mercaptans can then be obtained from their lead salts by treatment with dilute acid. Mercaptans have various applications. The lower mercaptans are utilized in the manufacture of pharmaceuticals such as sulfonal and the like. Mercaptans and their salts, especially the lead salts, may be used to purify petroleum distillates containing corrosive sulfur. Lead mercaptides when dissolved in motor fuel give it valuable anti-knock properties.

Referring now to the drawing, the single figure discloses an apparatus for carrying out the process. 10 is a container having a supply pipe 11 leading thereto. Surrounding the container and a portion of the supply pipe is a jacket 12 through which steam or other heating agent may be passed. A valve 13 is provided in the supply pipe 11 exterior of the jacket and a pipe 14 controlled by the valve 15 communicates with the pipe 11 ahead of the valve 13. A second valve 16 is provided in the pipe 13 beyond the junction of the pipe 14 with the pipe 11. A discharge pipe 17 leads from the container 10 to a condenser 18, the outlet of which discharges into a separator 19. From the top of the separator 19, a pipe 20 leads by way of the pump 21 to the pipe 11 at a point intermediate the valve 13 and the jacket 12. A pipe 20a leads from the separator 19 at a point above the bottom of the tank to a washing tank 22. A discharge pipe 23 leads from the top of the washing tank 22 to the bottom of a tank 24. A second discharge pipe 25 leads from a point near the bottom of the tank 22 to any suitable place for disposal of the liquid flowing therethrough. A discharge pipe 26 leads from the upper part of the tank 24 to the lower part of the tank 27, and a discharge pipe 28 leads from the upper portion of the tank 27 to a storage tank not shown. The pipes 29 and 30 lead from points near the bottom of tanks 24 and 27 respectively to filters 31 and 32 which will remove from the liquid discharged through the pipes 29 and 30 any precipitate contained therein. The filters are suitably connected to a discharge line for disposing of waste liquid. By means of pump 33, pipe 34 and spray head 35 washing fluid may be introduced into the tank 22. Likewise by means of pipes 36 and 36a and spray heads 37 and 37a treating liquid may be showered into the liquid contained in the tanks 24 and 27 respectively. Man holes 38 and 39 are provided in tanks 24 and 27 respectively to allow the removal of any precipitate adhering thereto.

In order to produce mercaptans and mercaptides, the container 10 is filled with a suitable catalyst and a mixture of hydrogen sulfide gas and a vapor containing olefins is supplied thereto through the pipes 11 and 14 respectively. The gas and the catalyst are maintained at proper temperature by passing steam through the jacket 12 if necessary. Vapor discharged from the container 10 is liquefied in the condenser 18, after which it flows into tank 19 where any uncondensed gas present separates from the liquid. The uncondensed gas is returned to the pipe 13 by way of the pipe 20 and pump 21. The liquid flows by way of pipe 20a into tank 22 where it is washed with a solution of lead acetate, the solution being supplied through the spray head 35. Because of the difference in gravity of the lead acetate solution and the washed liquid, the former will flow out through the pipe 25 and the latter through the pipe 23 to the tank 24. Here it is brought into contact with sodium plumbite, sprayed into the tank through the spray head 37. The treated liquid being lighter will rise to the top and pass out through the pipe 26 to the tank 27 where the treatment is repeated. The heavier sodium plumbite is drained out of the tanks 24 and 27 through the pipes 29 and 30. In the tanks 24 and 27, the mercaptans are converted to lead mercaptides. In the case of the lighter mercaptans, the mercaptide will precipitate as a yellow powder which may be separated by filtration from the liquid passing out through the pipes 29 and 30. With the heavier mercaptans, the mercaptides will be wholly or partly dissolved in the residual oil and can be obtained therefrom by evaporation in vacuo. Where it is desired the lead mercaptides may be used in solution in the liquid. Where the mercaptans are wanted they are obtained by treating the lead mercaptide with dilute acids in the manner known in the art followed, if necessary, by a redistillation.

It is understood that the above description sets forth only one way of carrying out the invention which relates to the synthesis of mercaptans and mercaptides. It will be understood that the means of isolating and purifying the products herein described may be varied considerably without departing from the spirit of the invention which is broadly the catalytic synthesis of mercaptans from hydrogen sulfide and olefins. The apparatus used may be any which effects the contact of gas or vapor with solids. The treating tanks may be any effective type. Where the formation of the mercaptides of other metals than lead is desired, appropriate solutions may be used. The reaction may advantageously be performed at elevated pressure. Higher yields may be obtained by removing unreacted gases and liquids and resubjecting them to the catalyst.

What we claim as new and desire to secure by Letters Patent of the United States is:

1. The process of producing mercaptans which comprises subjecting vapors containing hydrogen sulphide and olefins to the action of an adsorptive catalyst comprising one of the group consisting of fuller's earth and silica gel.

2. The process of producing mercaptans by the catalytic interaction of hydrogen sulphide and olefin vapor.

In testimony whereof, we have signed our names to this specification.

PHILIP S. NISSON.
MALVIN R. MANDELBAUM.